United States Patent
Bhogal et al.

(10) Patent No.: US 8,241,131 B2
(45) Date of Patent: Aug. 14, 2012

(54) AVATAR PROTECTION WITHIN A VIRTUAL UNIVERSE

(75) Inventors: Kulvir S. Bhogal, Fort Worth, TX (US); Rick A. Hamilton, II, Charlottesville, VA (US); Neal M. Keller, Yorktown Heights, NY (US); Clifford A. Pickover, Yorktown Heights, NY (US)

(73) Assignee: International Business Machines Corporation, Armonk, NY (US)

( * ) Notice: Subject to any disclaimer, the term of this patent is extended or adjusted under 35 U.S.C. 154(b) by 992 days.

(21) Appl. No.: 12/238,541

(22) Filed: Sep. 26, 2008

(65) Prior Publication Data

US 2010/0081508 A1   Apr. 1, 2010

(51) Int. Cl.
   *A63F 9/24* (2006.01)
(52) U.S. Cl. .......................................... 463/42
(58) Field of Classification Search ...................... 463/42
   See application file for complete search history.

(56) References Cited

U.S. PATENT DOCUMENTS

| 7,073,129 | B1 | 7/2006 | Robarts et al. |
| 7,319,992 | B2 | 1/2008 | Gaos |
| 2007/0035549 | A1 | 2/2007 | Jung et al. |
| 2007/0106526 | A1 | 5/2007 | Jung et al. |
| 2009/0177979 | A1* | 7/2009 | Garbow et al. ............... 715/757 |

FOREIGN PATENT DOCUMENTS

WO   0150387   12/2001

* cited by examiner

*Primary Examiner* — Omkar Deodhar
(74) *Attorney, Agent, or Firm* — Patrick J. Daugherty; Driggs, Hogg, Daugherty & Del Zoppo Co., LPA (57) ABSTRACT

Methods, program products, services and devices are provided for protecting a protected avatar from actions of a second avatar within a virtual universe. Protection is implemented for a protected avatar from a second avatar within a virtual universe, including identifying an activity of the second avatar and disqualifying the second avatar from engaging in the identified activity within the virtual universe as a function of a relation of the identified activity to the protected avatar. A protective action is defined, associated with the identified activity and executable against the protected avatar or the second avatar. Activity of the protected avatar or the second avatar is monitored within the virtual universe for an occurrence of the identified activity, and the protective action is executed against the protected avatar or the second avatar in response to detecting the occurrence of the identified activity.

18 Claims, 3 Drawing Sheets

| Region | Triggering Behavior | Protective Action |
|---|---|---|
| G-rated | Exhibit objectionable object | Teleport protected group to another G-rated area.<br><br>Warn, teleport, suspend or banish offending avatar from G-rated area or VU before allowing group to return.<br><br>Confiscate object.<br><br>Require monitoring services engagement for permission to enter G-rated region. |
| PG-rated | Unauthorized physical contact. | Teleport group to another G or PG-rated area.<br><br>Warn, teleport, suspend or banish offending avatar from G and PG-rated area or VU before allowing group to return.<br><br>Prevent offender proximity to other avatars.<br><br>Require monitoring services engagement for permission to engage in physical contact, or to enter G or PG-rated region. |
| Adult-rated | Non-consensual contact or conduct with scripted object. | Teleport group to another Adult, PG or G-rated area.<br><br>Prevent offender proximity to other avatars or remove ability to use scripted objects.<br><br>Warn, suspend or banish offending avatar from adult-rated area or VU before allowing group to return.<br><br>Require monitoring services engagement for permission to engage in physical contact, use scripted objects or to enter Adult-rated region. |

FIG 4

AVATAR PROTECTION WITHIN A VIRTUAL UNIVERSE

FIELD OF THE INVENTION

The present invention generally relates to protecting a virtual universe (VU) user represented by an avatar from the actions of one or more other user's avatars. Notification and other responsive actions taken with respect to other user's avatars are also discussed.

BACKGROUND OF THE INVENTION

A Virtual Universe (VU) is a computer-based simulated world or environment; other terms for VU's include metaverses, "3-D Internet" and Virtual World, and VU will be understood to represent any of these environments. Users inhabit and traverse a VU, and interact with other VU users through the use of an avatar, a graphical representation of the user often taking the form of a cartoon-like human though any two or three dimensional graphic image or rendering may be utilized. In order to participate within or inhabit a VU, a user creates an agent which functions as the user's account, and upon which the user builds an avatar tied to an inventory of assets the user owns in the VU and associated with the agent.

Large robust VU's and massively multiplayer online games, such as for example Second Life® (SECOND LIFE is a trademark of Linden Research, Inc. in the United States and/or other countries), Entropia Universe™ (ENTROPIA UNIVERSE is a registered trademark of MindArk PE AB in the United States, other countries, or both), The Sims Online™ (THE SIMS ONLINE is a trademark of Electronic Arts, Inc in the United States, other countries, or both), and There™ (THERE is a trademark of Makena Technologies, Inc. in the United States, other countries, or both) render and display detailed, large and complex graphic environments within which users may travel and participate as if a character in an expressionistic or fantastical fictional world or within a realistic or representational approximation of real life.

VU's are also commonly defined with respect to VU regions, virtual areas of land within the VU typically residing on a single server, with each region amenable to provision and management by a one or more participating providers. The size and complexity and variety of resources found in a VU are related to the number of providers participating and hosting regions through server hosting. And the success of a VU may depend upon attracting users and keeping them engaged and participating in the VU environment, thereby adding value to the providers who bear the cost in providing VU region content and services (and correspondingly expect an appropriate level of multiple-user engagement as a return on their investment), as well as for other users who wish to engage many others in a large virtual community. For example, an informational or service-related region managed by a non-profit organization may desire or expect a given level of VU user engagement and participation, and commercial region providers may desire to engage in a given level of commercial transactions (e.g. sales) or achieve a level of marketing exposure among VU users.

VU avatars may exhibit inappropriate and threatening behaviors relative to other users or the VU environment itself. However, prior art protection mechanisms are limited in their efficacy, and in particular with respect to offering proactive protection from hostile actions intentionally directed against a specific avatar by another user's avatar. For example, a user with personal knowledge of another user may use an avatar to deliberately harass or stalk the avatar of the other user. Furthermore, some harassing behavior personally offensive or threatening to a target avatar may in fact be perceived as ambiguous or not objectionable to other users or to VU provider supervisory entities, and thus some harassing activities may actually be permitted by VU provider or supervisory entities, thereby rendering general protection mechanisms provided by some VU providers ineffective or even useless in protecting the targeted avatar. Without effective VU provider protection, VU users whose avatars are subject to objectionable behavior are forced to take actions on their own behalf, actions which may be burdensome and difficult for the user, or may even be proscribed by VU operating agreements or other normative rules (for example, directly responding with harassment, insults, violence in kind, etc.)

SUMMARY OF THE INVENTION

Methods are provided for protecting a protected avatar from actions of a second avatar within a virtual universe. Protection is implemented for a protected avatar from a second avatar within a virtual universe, including identifying an activity of the second avatar and disqualifying the second avatar from engaging in the identified activity within the virtual universe as a function of a relation of the identified activity to the protected avatar. A protective action is defined, associated with the identified activity and executable against the protected avatar or the second avatar. Activity of the protected avatar or the second avatar is monitored within the virtual universe for an occurrence of the identified activity, and the protective action is executed against the protected avatar or the second avatar in response to detecting the occurrence of the identified activity.

Methods also provide protective services to a virtual universe resident, with a service provider offering protective services for a virtual universe client resident. In response to an acceptance of offered services, service providers implement protection for a virtual universe client resident from a second resident, the protection implementing including preventing the second resident from engaging in a proscribed activity as a function of an association of the proscribed activity with the client resident. Service providers monitor activity of client residents and second residents within the virtual universe for indicia of the proscribed activity, and execute a protective action against the client resident or the second resident in response detecting the indicia.

Methods also protect a protected avatar from actions of a second avatar within a virtual universe by producing computer executable program code, storing the code on a computer readable medium, and providing the program code to be deployed and executed on a computer system engaging a virtual universe. The program code causes a computer system to distinguish an activity of the second avatar within the virtual universe as a function of a relation of the distinguished activity to the protected avatar and define a protective action associated with the distinguished activity and executable against the protected avatar or the second avatar. The program code also causes a computer system to monitor activity of the protected avatar or the second avatar within the virtual universe for the distinguished activity, and to execute the protective action against the protected avatar or the second avatar in response to detecting the distinguished activity.

Programmable devices are also provided, the devices having processing means; memory in communication with the processing means; and a network interface in communication with the processing means and the memory. The processing means are configured to detect an avatar activity hostile to a protected avatar within a virtual universe and prevent a second avatar from engaging in the hostile activity within the virtual universe as a function of a relation of the hostile activity to the protected avatar. The processing means are further configured to monitor activity of the protected avatar or the second avatar within the virtual universe for the hostile activity and cause a virtual universe computer application to take a protective action against the protected avatar or the second avatar in response to detecting the hostile activity.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience purposes, the Detailed Description of the Invention has the following sections:
I. General Description; and
II. Computerized Implementation.

I. General Description

Mischief making, spamming, and other threatening behaviors directed toward VU users and their avatars are known, and in some respects becoming more common. VU providers may set policies for providing protections to user avatars that incorporate or codify community standards which specify prohibited certain behaviors, and may condition participation in the VU upon agreeing to specific terms and conditions. Such standards are generally useful in addressing readily-identifiable and generic behaviors defined with respect to all users or the environment itself, such as intolerance, harassment, assault, violating the privacy of conversations, indecency and disturbing the peace.

Exposure to objectionable behavior may also be limited by designating regions of a virtual universe as "safe" or "unsafe" or by rating them (e.g. "mature," "PG", etc.), in some examples with corresponding restrictions on a minimum age needed to enter regions designated as "unsafe" or "mature," and sometimes also requiring users to agree to hold the VU harmless for offensive conduct and contacts experienced in designated unsafe or mature regions, the user accepting the risk upon entering such a region. VU's may also take steps to ensure that wrong-doers do not hide behind other or multiple avatars, for example requiring identification of the primary user of alternate accounts in the case of a user utilizing additional avatars. Notification mechanisms to enable reporting of violations of community standards and minimum age restrictions may include abuse reporter tools, some of which keep the identity of the reporter confidential. Immediate assistance can also be provided by in-world avatars representing the virtual universe provider.

Virtual universe providers may also maintain a public list of abuse incidents including the date, location in the virtual universe, policy violated, nature of the abuse and action taken, some of which do not identify the offending avatar or owner of the user account. Tracked and recognized abuse incidents may include objectionable-object littering, indecency in public areas, assault with scripted objects in designated safe areas, disturbing the peace with repetitive sound spam, verbal abuse by an alternate account avatar and indecencies or obscene images in the publicly accessible avatar profile. Actions taken by virtual universe providers in response to abuse incidents typically involve warnings, suspensions, permanent banning from a virtual universe, and even possible legal action (for example, possible criminal law actions with respect to activities deemed illegal in an appropriate jurisdiction).

However, while virtual universe providers generally retain the right to resolve disputes between residents, they generally do not make use of publicly available real-world records related to real-world disputes between two virtual universe users, focusing instead on actions and behavior within the VU. More particularly, prior art policies and mechanisms for restricting the behavior of avatars relative to one another in a virtual universe are not generally responsive to situations arising from or dependent upon prior histories or facts outside the VU environment, such as where users know each other in real life or prior virtual universe participation and may be deliberately harassing or stalking each other, or wherein a casual, unplanned encounter may be problematic due to prior histories, real world facts, etc.

Virtual universe providers are also limited in effectively reacting to problem incidents after they occur, and relying generally on threats of banishment to enforce community standards for future actions. Users whose avatars are subject to objectionable behavior and seek to avoid it are also generally required to possess a virtual universe skill set to take protective actions on their own behalf, for example an ability to quickly teleport to a safe location, or block the receipt of text messages from offending avatars. Residents new to a virtual universe may not possess the technical skills needed to minimize offensive behavior before the threat of suspension or banishment is implemented by a virtual universe provider with respect to an offending party. Residents may also be uncomfortable using abuse reporter tools, particularly when they are experiencing the stress associated with harassment. Thus, placing responsibility on a resident to anticipate that an offensive incident is about to take place, to take evasive action, and to report the abuse when under stress, places too much of a burden on the harassed user, discouraging user participation, and particularly by users with low computer skills or those otherwise unfamiliar with the quick pace of immersive environments. Such policies may also discourage parents from enrolling their children as residents because of concerns that designated "safe"/"PG" regions are not really safe. Though some of these problems may be ameliorated by providing immediate assistance by human-operated in-world avatars representing the virtual universe provider, such services are expensive to provide for a VU provider.

VU and third party service providers may also offer a variety of services to enhance the experience of a VU user client, including providing travel, recreational or educational services in virtual universes. It would be advantageous for such travel companies to be able to guarantee that their clients will be free from harassment, indecency or other objectionable behaviors from resident avatars unknown to them in each region served within a VU. Without the ability to offer a safe experience to their clients in a given region such companies may avoid the region or even an entire virtual universe domain in fear of legal exposure from inappropriate behaviors by residents, thereby directly resulting in a loss of revenue opportunities for a virtual universe region, domain or environment provider.

Figure 1:
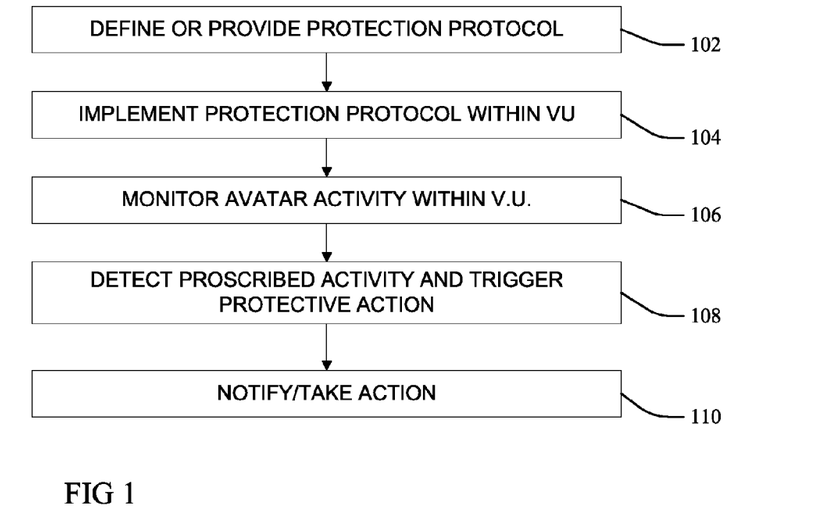
FIG. 1 is a flow chart illustrating a process and system for protecting a first avatar from actions of another avatar within a virtual universe.

Referring now to FIG. 1, a method and process for protecting a first avatar from actions of another avatar within a virtual universe (VU) according to the present invention is provided. At 102 a protection protocol is provided or defined for the first avatar with respect to a second avatar or a person, entity or user represented by the second avatar. At 104 the protection protocol is implemented within the context and framework of the virtual universe domain, the implementing comprising defining at least one rule or proscribed activity with respect to activity of another avatar within the virtual universe domain, and a protective action executable with respect to one or both avatars within the virtual universe domain. At 106 a supervisory entity or application operating within the virtual universe monitors activity of the first avatar and/or the second avatar within the virtual universe domain as provided by or as a function of the protocol implementation. At 108 the monitoring results in a triggering of an application of the implemented protocol in response to or as a function of detecting the first avatar or the second avatar violating the protocol rule, and at 110 the protocol protective action as implemented at 104 is initiated and taken with respect to at least one of the first avatar and the second avatar.

In one aspect, the protective protocol may be an agreement, which may be understood to comprehend any document, contract, court order, decree, governmental rule or regulation or any other framework of duties and responsibilities defining an aspect of a relation of a protected avatar to another avatar or to a VU environment in general. Thus, where a protected "Avatar 1" and another avatar of concern, "Avatar 2," are known to each other and have historically been in conflict, either in real life or within one or more virtual universe domains, protective protocol agreements may exist or be defined to protect Avatar 1 in anticipation of further conflicts.

More particularly, situations in real life can spill over into a virtual universe frequented by the same individuals as users through their avatars, and histories including abuse incidents and acrimonious divorce proceedings may present special challenges to virtual universe providers from a business and legal perspective; for example, taking a firm action such as banishing a resident who offends another resident known to him or her results in a direct loss of revenue from the banished resident. False or mistaken reports of virtual universe abuse, for example by a friend or family member of a reputedly harassed VU resident, may also result in unfair banishment of an accused resident from a VU, or regions thereof such as clubs, cultural or recreational regions where the falsely accused resident has developed valuable social or business relationships. Though VU providers and supervisory entities may undertake investigations to verify accusations, such investigations require the expenditure of resources, and sometimes of significant and expensive resources.

Accordingly, real-life agreements, such as for example divorce decrees and restraining orders issued by a courts having jurisdiction over avatar users and/or VU or VU services provider may define and impose duties with respect to actions that the respective users may take within a VU through their avatars. According to the present invention, advantages are obtained by implementing such agreements into the VU environment, in one aspect helping VU and VU service providers to identify and avoid potential liabilities, and, in another aspect, to serve in custom configuring a VU environment to meet the unique needs of a given protected avatar (thereby enabling some protected avatar users to participate within a VU without fear, etc., who may otherwise decline to participate).

Thus, protective protocol agreements may directly proscribe, or be interpreted to directly proscribe, certain avatar activities hostile to an interest of the protected avatar. They may also impose duties on VU providers to report transgressions or any preventive measures instituted. Virtual universe providers are thus enabled to provide "virtual restraining order" proactive services, in one aspect enabling the development of additional business opportunities associated with providing regions safe for protected parties as defined by such real-world restraining orders. A user may desire to purchase consistent restraint/protective services which will span their residence in multiple virtual universes, and hence may be implemented through differing embodiments depending on each particular virtual universe visited. Thus, it is advantageous to a virtual universe provider or a supervisory entity to provide consistent protection services by configuring appropriate protective mechanisms for each specific visited VU, in some examples including negotiating arrangements with other virtual universe providers to configure and extend such protection to each divergent VU. In one aspect, this provides a sustainable competitive advantage over other VU providers and VU service providers in attracting new residents with a variety of concerns relative to inappropriate behavior in virtual universes.

Figure 2:
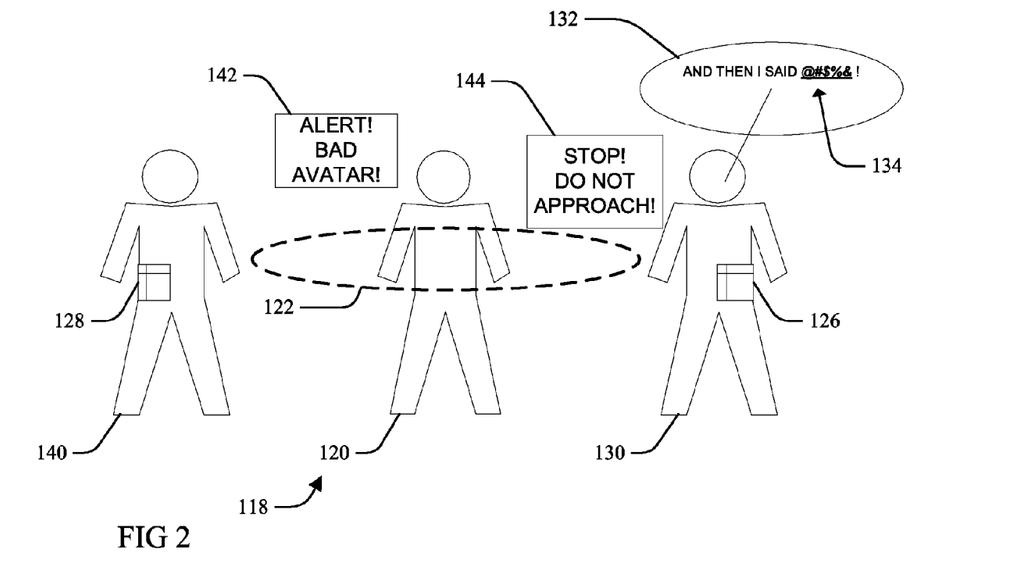
FIG. 2 is a block diagram illustration of protecting a protected avatar from actions of another avatar according to the present invention.

Thus, in some embodiments, a protection protocol agreement may be a real-world restraining order issued by an appropriate governmental entity having a legal jurisdiction over the user of a protected avatar, or over other party/avatar user(s), wherein implementing the restraining order comprises deriving and creating a "virtual restraining order" for implementation within the context of the virtual universe in order to protect the first protected avatar from virtual universe activities of one or more other second avatars in the virtual universe domain of implementation. FIG. 2 provides an illustration of an implemented avatar protection according to the present invention within a virtual universe domain 118. A protection protocol implemented within the context and framework of the virtual universe 118 results in an exclusion zone 122 projected about a protected avatar 120. More particularly, a second potentially-harmful avatar 130, identified by the implemented protection protocol as hostile to the protected avatar 120, is prevented from approaching or otherwise locating spatially close to the protected avatar 120 within the virtual universe 118 within the exclusion zone 122.

In some embodiments, the protected avatar 120 seeking protection from the second avatar 130 may also directly initiate or engage the services of a VU provider or another third party services provider, who may offer a protection service that protects the protected avatar 120 from the second avatar 130 in exchange for compensation. In some examples, the protection service or the VU provider may restrict the second avatar 130 from interacting with the protected avatar 120, and the protected avatar 120 may also be (optionally) restricted from interacting with the second avatar 130.

A relationship of the protected avatar 120 relative to the second avatar 130 may be used to define the respective avatars and their obligations; for example, the user of the protected avatar 120 may be a child and the user of the second avatar 130 may be an adult who has a history or other behavioral attribute indicating that he or she may pose a threat to children in general. The users of the protected avatar 120 and the second avatar 130 may also be previously known to each other, either in real life or one or more virtual universes, and thus their relative identities as the protected avatar 120 and the second avatar 130 and their respective obligations and restraints with respect to each other defined as a function of their history relative to each other.

An implemented protocol may also include a plurality of different triggers and actions, and, in one aspect, these triggers may be configured to recognize and protect an avatar in situations and contexts that, although not violating any general or normative rule within the VU, are nevertheless inappropriate as defined by the protective protocol or its implementation. For example, a parent of a child using the protected avatar 120 concerned with certain inappropriate behavior may desire that the protected avatar 120 be protected from said certain inappropriate behavior by any resident, including preventing such an avatar from coming close to the protected avatar 120. However, it may occur that although the second avatar 130 is evidencing said certain inappropriate behavior, he or she is either not exceeding some objective community standard threshold, or the protected avatar 120 and the second avatar 130 may be presently located in a VU region with a higher permissive threshold than another VU region, and thus a common protective action (e.g. preventing the second avatar 130 from coming close to the protected avatar 120) may not be triggered as it may not be available or indicated by the given facts and general VU region settings. The protective protocol may thus be configured to take alternative actions in response to the inappropriate behavior generally neutral to or not directed against the putatively offending second avatar 130, for example alerting the protected avatar 120 or the parent or other party of the situation with a graphical text message 142. Alternative measures include removing the protected avatar 120 from the region, in some cases by default, or in some cases temporarily and further giving the parent or the protected avatar 120 an opportunity to acknowledge and agree to the protective action or override the removal.

Configuring a user's VU environment responsive to both real-life and virtual life conflict provides advantages in enhancing the user's VU experience. In one aspect, a user may not distinguish real-world and virtual universe conflicts, and accordingly, in some embodiments, action triggers may include behaviors defined by real-life restraining orders. Referring again to FIG. 2, in another aspect, behaviors by a third avatar 140 (sometimes otherwise acceptable by a VU normative rule) may also trigger a rule violation or protective action as function of determining that the third avatar 140 is actually acting as a surrogate for the second avatar 130 subject to a restraining order. For example, the third avatar 140 may be hired, coached or controlled by the second avatar 130 to make contacts with the protected avatar 120 forbidden to the second avatar 130, and thus determining an association of the third avatar 140 with the second avatar 130 results in triggering of the protective protocol exclusion zone 122 with respect to the otherwise innocuous third avatar 140.

In another aspect of the present invention, a user may be offered an opportunity to purchase enhanced monitoring services, which may be offered to both protected avatars for protection and other avatars to ensure that they are not violating a protective protocol with respect to a protected avatar. For example, a human or automated enhanced avatar monitoring service may be provided by a virtual universe provider or other service provider as an alternative to suspension and banishment of the second avatar 130, in some examples required according to a legal liability or obligation of the virtual universe service provider resulting from a court order. Thus, in some examples, an automated enhanced avatar monitoring service may assign an automated avatar to shadow the second avatar 130 and record all conversations and actions relative to the protected avatar 120.

Triggering application of protective measures of a VU-implemented protocol, for example in response to detecting a rule violation at 108 of FIG. 1 as described above, may comprise a variety of trigger mechanisms, illustratively including a proximity threshold violation, for example an unauthorized adult second avatar 130 is detected within a threshold permissible radius of a child protected avatar 120; detecting presence or possession of a specific banned inventory item 126 or class of item 126, for example, the second avatar 130 has a weapon, malicious software, etc. item 126; and detecting a past history of undesirable chats or other text messages, for example parsing a second avatar 130 text communication 132 to determine that Avatar 2 uses offensive language or terms 134 and hence should be proscribed from contact with a child protected avatar 120, or that previous chats between the protected avatar 120 and the second avatar 130 comprise offensive or threatening words or phrases. It will be appreciated that parsing may refer to analyzing input in a specific computer language against the formal grammar of the language, often to validate the input or create an internal representation for use in subsequent processing, as well as to analyzing and describing grammatical structures of a sentence in comprehending the meaning of a sentence or term therein: thus parsing may be understood generally as analyzing text items within text communication for recognizing the presence of trigger terms, phrases, activities and behavioral attributives in order to implement protections according to the present invention.

Illustrative but not exhaustive protocol protective actions or restrictions, for example an action taken at 110 of FIG. 1 as described above, include: transporting the protected avatar to a safe region or environment, for example transporting a child protected avatar 120 to a location within the VU beside or within a safe penumbra of a parent's avatar; providing a graphical indication 142 to the protected avatar 120 to illustrate and convey that the second avatar 130 is within a certain proximate distance or radius value; notifying a third party (e.g. a parent) of an implemented protocol rule violation or other trigger; preventing either of the protected avatar 120 or the second avatar 130 from being with a specified distance or radius defined by the exclusion zone 122 of the other of the protected avatar 120 and the second avatar 130.

Permission for the second avatar 130 to be in a specified proximity/exclusion zone 122 of the protected avatar 120 may also be conditional upon regional VU designations, for example permitting proximity only in one or more designated places where the second avatar 130 had previously socialized but prohibiting the second avatar 130 from following the protected avatar 120 into a new region, in one aspect presuming that such action would be indicative of stalking the protected avatar 120. Determining an implemented protocol rule violation or other trigger or taking a protocol protective action may also be dependent upon occupation of either the protected avatar 120 or the second avatar 130 within certain defined or rated regions within the VU; for example, location of a child protected avatar 120 within a VU region designated as "child-friendly" may initiate or enable enforcement of one or more rules, triggers or actions defined as a function of the child-friendly region, in some examples resulting in preventing the physical location of an unauthorized adult second avatar 130 near the child protected avatar 120 while the protected avatar 120 is occupying the child-friendly region. It will also be appreciated that methods, systems and processes described above and otherwise herein may also be applicable to avatars representing or being operated by artificial entities, for example including robot servants and automated pets, as well as human user-operated avatars.

Protective actions and restrictions may include warning the second avatar 130 that a real-life restraining order from a court is known and recognized by the virtual universe provider, and informing the second avatar 130 through a graphic warning 144 that the VU provider is thereby required by law to report any inappropriate behavior by the second avatar 130 towards the protected avatar 120 to an appropriate authority.

Implemented protocol administration may also be a function of time. For example, in one embodiment if a restricted second avatar's 130 behavior is determined to fall within appropriate or permitted guidelines for a specified elapsed period of time relative to the protected avatar 120, then certain restrictions on the second avatar 130 under the protocol may be relaxed, for example enabling the second avatar 130 to teleport to new regions occupied by the protected avatar 120 without presuming said teleporting constituted an indication of stalking behavior, or even allowing the second avatar 130 to approach within the exclusion zone 122.

Some embodiments may be configured to serve VU travel companies which provide travel, recreational or educational services in virtual universes and wish to guarantee that their clients will be free from harassment, indecency or other objectionable behaviors from resident avatars unknown to them. In some embodiments, a VU travel or protection services provider may negotiate with one or more virtual universe providers, domains or regions to agree upon the identification of certain objectionable behaviors that are to be proactively prevented or minimized from occurring when clients of the travel or protection services provider visit. The negotiated behaviors or a subset thereof may also be designated to apply to clients of the travel or protection services provider during their VU participation. In one aspect, some clients may develop friendships and other interpersonal relationships and histories with other avatars (including other clients) during their VU visits, and thus it may be in the interest of the provider to monitor their clients for inappropriate behavior as well.

In some embodiments, specific examples and/or levels of proscribed behaviors may be provided, for example further defining levels of behaviors associated with intolerance, harassment, assault, violating the privacy of conversations, indecency and disturbing the peace. Thus, harassment may be defined as provocative text chat of a sexual or violent nature; assault may be defined as repeatedly bumping another avatar, or targeting another avatar with a scripted object; violating the privacy of conversations may be defined as monitoring private text chats through a "private eye" or surrogate avatar or other method; indecency may include bringing a sexually suggestive object out of inventory in public or in view of another avatar; disturbing the peace may include repeatedly generating a sound, for example a sound spam or a repetitive sound having a certain minimum decibel level.

Protective actions may include immediately teleporting one or more avatars against which objectionable behavior is directed (for example, an entire tour group) to a safe area, in some embodiments if the objectionable behavior cannot be proactively prevented. An abuse report may also be filed with a virtual universe or region provider, in some embodiments on behalf of a VU travel or protective services company. An offended avatar may also be offered an opportunity to be shadowed by an enhanced monitoring avatar, in some examples at the expense of the VU travel or protective services company already providing protection services to the offended avatar. Moreover, in some embodiments, a VU travel or protective services company may offer to negotiate protective services on behalf of a user, wherein the protections negotiated may be incorporated directly into an agreement between the individual user or resident seeking protection and the virtual universe provider.

Advantages are provided by creating additional revenue generating opportunities and options for virtual universe providers and VU region providers, wherein said providers may offer additional enhanced resident behavior managing services for increased consideration. Virtual universe providers are also enabled to attract and serve users from populations at risk (for example, children, the elderly, persons who have been the victims of abuse, etc.) who need a higher standard of care than the general client or customer population. Virtual universe providers may also attract business from other companies providing travel, recreational and educational services and who are concerned about possible inappropriate behavior by residents of regions visited, which may be directed towards the tour groups, in one aspect reducing exposures to legal liability or risk of business loss associated with client harassment.

Avatar tracking data may be monitored at different levels of granularity. For example, positional information may be generated every minute or every time a user teleports, flies, or moves a specified threshold distance value. Information may also be generated every time an item is put into an avatar's inventory. In one implementation, a daemon process may regularly poll a monitored/supervised avatar for current location information and store this information for subsequent transmittal to a supervisory entity or third party.

In some embodiments, a VU provider or protection service may maintain one or more databases comprising identifiers for user avatars, a desired nature of protection, and the desired alerts to trigger such protection. Thus, referring again to FIG. 2, in one example a first database record with respect to the protected avatar 120 associates a generally circular exclusion zone 122 defined by a 30 foot proximity radius with respect to the second avatar 130, wherein violation of the 30-foot radius by the second avatar 130 triggers a protective action of teleporting the protected avatar 120 to a safe room or to a parent; and a second database record with respect to the protected avatar 120 associates an inventory item 128 restriction with respect to the third avatar 140, wherein violation of inventory item restriction by the third avatar 140 triggers a protective action of physically preventing the third avatar 140 from getting close to the protected avatar 120.

Protective measures may be implemented in a variety of ways. For example, if the second avatar 130 attempts to approach the protected avatar 120 within a minimum specified threshold distance value, VU client motion controls of the user of the second avatar 130 may be prevented from achieving movement of the second avatar 130 in a direction that would violate the minimum specified threshold distance value or exclusion zone 122. Moreover, according to the present invention virtual universe providers are also enabled to provide a greater variety of user-appropriate and safe regions through a greater granularity of control over resident behaviors, for example enabling multiple definitions of "PG" and "adult" regions as functions of divergent user needs and objectives, as well as offering flexibility in constraining undesirable behavior through offering a plurality of different enhanced monitoring services in lieu of banishment. This may not only avoid loss of subscription fees by a banished user or resident, but offer an opportunity to receive additional service charges in exchange for enhancing monitoring of a trouble-maker avatar.

Figure 3:
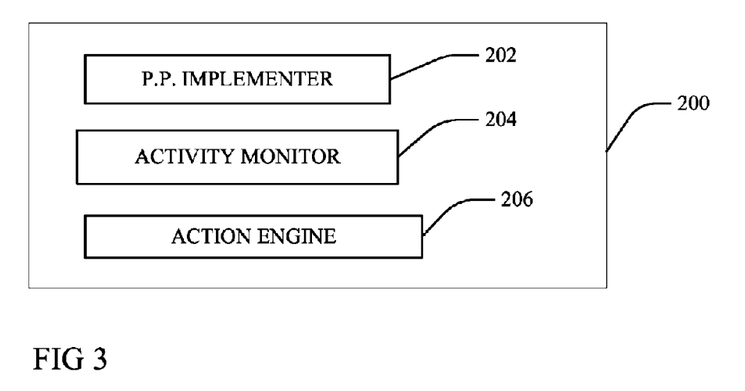
FIG. 3 is a block diagram illustration of a virtual universe programmable device configured to protect a first avatar from actions of another avatar within a virtual universe.

FIG. 3 illustrates a logic machine 200 configured to implement protection methods and mechanisms to protect a VU avatar from the actions of other avatars within a virtual universe domain. The logic machine 200 comprises a Protective Protocol (P.P.) implementer component 202 configured to convert, translate or otherwise define protocol aspects into rules, procedures and/or actions in a form implementable within the operating environment of the virtual universe. An activity monitoring component 204 is configured to observe the activity of one or more avatars identified by or otherwise relevant to the protocol as implemented to detect any activity by the other avatars that may trigger a protective action for the benefit of the protected first avatar. An action component 206 is configured to implement a protective action, including a protective action defined and implemented with respect to the protective protocol.

Figure 4:
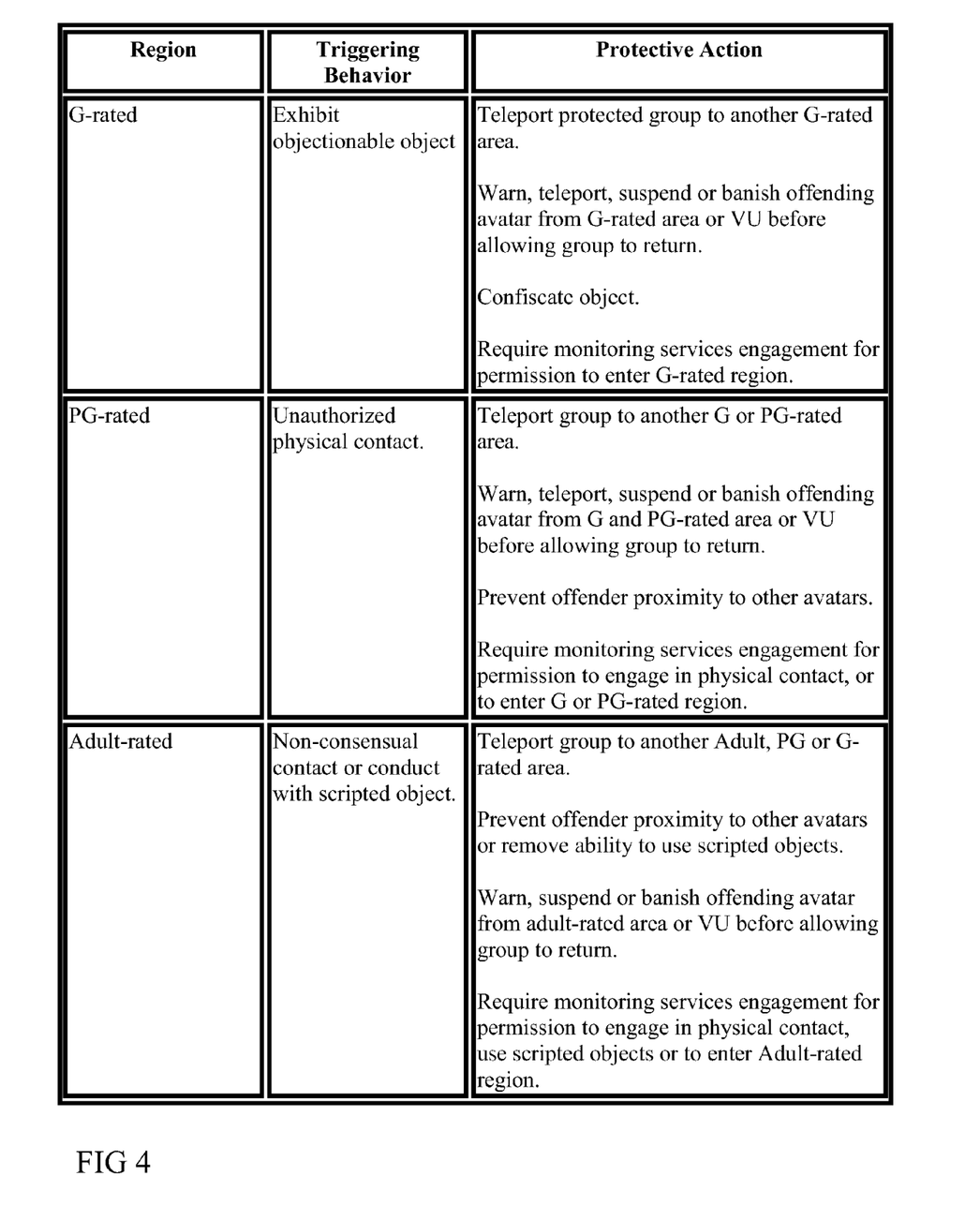
FIG. 4 is a tabular representation of a policy table for use in protecting an avatar from actions of another avatar within a virtual universe.

FIG. 4 illustrates a policy table implementation example for use in triggering and effecting one or more protective actions as a function of VU region ratings and offending avatar behavior characteristics, in one embodiment implemented with respect to protecting members of a protective services entity client group. Triggering determinations are made as function of the region rating, and one or more protective actions suitable to the regional rating and optionally a history of the protected avatar/group or the offending avatar are selected from a plurality of options provided by the policy table.

In the present example illustrated in FIG. 4, an avatar exhibiting an objectionable adult-oriented behavior in a "G" rated region (one suitable for all ages of users) triggers protective actions suitable for a group for which G-rated region protection protocols are implemented. A first offense for an offending avatar with no other indications of inappropriate behavior may warrant only a warning to the offending avatar; a second offense or other history indicating prior actions inappropriate to a G-rated region may result in a notice and teleportation of the offending avatar out of the G-rated region to a non-G rated region; and a third offense or a significant history of prior actions inappropriate to other region ratings as well (such as PG or adult rated) may result in a suspension or regional access rights (e.g. of G-rated region access) teleportation to a purgatory or other restricted-rights region, or banishment of the offending avatar from all G-rated areas or other regions or the entire VU. An offending object may also be confiscated, with the determination a function of a nature or identity of the item (e.g. not confiscate an adult-oriented object, but confiscate a contraband item) as well as the history of the avatar (warn the first time, confiscate for repeated offenses). Moreover, if a plurality of offending avatars is located proximate to a protected group, then the entire protected group may also be teleported to another G-rated region, in one aspect to minimize the risk of additional offending behavior incidents potentially arising through proximity to a plurality of avatars with a prior history of offending behavior.

Protective actions may also include fee-generating options for the protective services or VU provider. This may include offering the protected group or the offending avatar fee-based enhanced monitoring services, in one aspect to enhance the protections offered to the protected group or to give notice to the offending avatar when his future actions may have the potential of incurring additional fees for monitoring services or negative history data. Fees for enhanced monitoring services required for further engagement in a given region or region category may be variable, including with services and fee rates determined as function of the region rating: thus PG-rated region permission may require enhanced monitoring of one or more behaviors different from those monitored for adult-rated regions, but may be included within a larger set of behaviors monitored for G-rated region permissions. In some examples, virtual universe providers may include in their agreement terms and conditions that previous cited behaviors in certain designated categories will result in specified actions (for example, an automatic temporary restriction on mobility, a restriction in the use of text chat, a restriction in the ability to display items from inventory, etc.) unless fee-based enhanced monitoring services are engaged for the offending avatar.

Triggers may vary by region. For example, proximity to a plurality of VU residents who have previously been cited in abuse reports for violent or offensive remarks or behaviors may result in an automatic teleport of an entire protected group to another safe region of comparable rating (for example, a G-rated region for a group rated for a G-rated region, or a G or PG rated region for a group rated for a PG-rated region). Other examples of region, incident and avatar-specific triggers and protective action selection are also provided by tabular illustration of FIG. 4. One skilled in the art will recognize that further parameters and selection criteria may be implemented, as wells as through other policy table configurations; FIG. 4 is only illustrative of one embodiment, and policy tables according to the present invention are not limited to the example provided by FIG. 4.

II. Computerized Implementation

Figure 5:
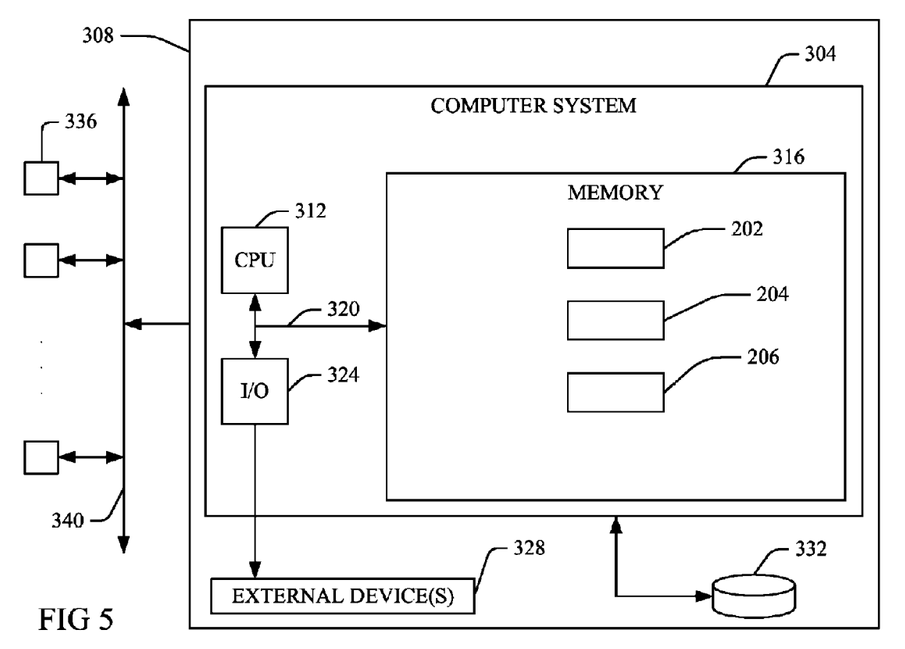
FIG. 5 is a block diagram illustrating an exemplary computerized implementation of a system and method for protecting a first avatar from actions of another avatar within a virtual universe.

The present invention may be implemented using conventional software tools and methods applicable to virtual universes, for example within a stand-alone VU application, or as a plug-in to an existing VU application. The system and mechanisms described could be implemented in a hosting system or grid for a virtual universe or in client software for the virtual universe installed on a user's personal computer or other programmable device. Referring now to FIG. 5, an exemplary computerized implementation includes a computer system 304 deployed within a computer infrastructure 308 such as a computer or a programmable device such as a personal digital assistant (PDA) or cellular phone. This is intended to demonstrate, among other things, that the present invention could be implemented within a network environment 340 (e.g., the Internet, a wide area network (WAN), a local area network (LAN), a virtual private network (VPN), etc.) in communication with one or more additional computers 336, or on a stand-alone computer infrastructure 308. In the case of the former, communication throughout the network 340 can occur via any combination of various types of communication links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet.

As shown, the computer system 304 includes a central processing unit (CPU) 312, a memory 316, a bus 320, and input/output (I/O) interfaces 324. Further, the computer system 304 is shown in communication with external I/O devices/resources 328 and storage system 332. In general, the processing unit 312 executes computer program code, such as the code to implement various components of the present invention, including the methods, processes and devices/systems illustrated in the Figures and described herein, including the Protective Protocol implementer 202, the activity monitoring component 204 and the action engine 206, which are stored in memory 316 and/or storage system 332. It is to be appreciated that two or more, including all, of the components may be implemented as a single component.

While executing computer program code, the processing unit 312 can read and/or write data to/from the memory 316, the storage system 332, and/or the I/O interfaces 324. The bus 320 provides a communication link between each of the components in computer system 304. The external devices 328 can comprise any devices (e.g., keyboard, pointing device, display, etc.) that enable a user to interact with computer system 304 and/or any devices (e.g., network card, modem, etc.) that enable computer system 304 to communicate with one or more other computing devices.

The computer infrastructure 308 is only illustrative of various types of computer infrastructures for implementing the invention. For example, in one embodiment, computer infrastructure 308 comprises two or more computing devices (e.g., a server cluster) that communicate over a network to perform the various process steps of the invention. Moreover, computer system 304 is only representative of various possible computer systems that can include numerous combinations of hardware. To this extent, in other embodiments, the computer system 304 can comprise any specific purpose-computing article of manufacture comprising hardware and/or computer program code for performing specific functions, any computing article of manufacture that comprises a combination of specific purpose and general-purpose hardware/software, or the like. In each case, the program code and hardware can be created using standard programming and engineering techniques, respectively. Moreover, the processing unit 312 may comprise a single processing unit, or be distributed across one or more processing units in one or more locations, e.g., on a client and server. Similarly, the memory 316 and/or the storage system 332 can comprise any combination of various types of data storage and/or transmission media that reside at one or more physical locations.

Further, I/O interfaces 324 can comprise any system for exchanging information with one or more of the external device 328. Still further, it is understood that one or more additional components (e.g., system software, math co-processing unit, etc.) not shown in FIG. 5 can be included in computer system 304. Moreover, if computer system 304 comprises a handheld device or the like, it is understood that one or more of the external devices 328 (e.g., a display) and/or the storage system 332 could be contained within computer system 304, not externally as shown.

The storage system 332 can be any type of system (e.g., a database) capable of providing storage for information under the present invention. To this extent, the storage system 332 could include one or more storage devices, such as a magnetic disk drive or an optical disk drive. In another embodiment, the storage system 332 includes data distributed across, for example, a local area network (LAN), wide area network (WAN) or a storage area network (SAN) (not shown). In addition, although not shown, additional components, such as cache memory, communication systems, system software, etc., may be incorporated into computer system 304.

While shown and described herein as a method and a system, it is understood that the invention further provides various alternative embodiments. For example, in one embodiment, the invention provides a computer-readable/useable medium that includes computer program code to enable a computer infrastructure to practice the present invention, including the methods, processes and devices/systems illustrated in the Figures and described herein. To this extent, the computer-readable/useable medium includes program code that implements each of the various process steps of the invention.

It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as the memory 316 and/or the storage system 332 (e.g., a fixed disk, a read-only memory, a random access memory, a cache memory, etc.).

Still yet, computer infrastructure 308 is intended to demonstrate that some or all of the components of implementation could be deployed, managed, serviced, etc. by a service provider who offers to implement, deploy, and/or perform the functions of the present invention, including the methods, processes and devices/systems illustrated in the Figures and described herein, for example by licensing methods and browser or application server technology according to the present invention to an internet service providers (ISP) or cellular telephone provider. In one embodiment, the invention may comprise a business method that performs the process steps of the invention on a subscription, advertising, and/or fee basis. Thus, a service provider can create, maintain, support, etc., a computer infrastructure, such as the computer infrastructure 308 that performs the process steps of the invention, and in return the service provider can receive payment from the customer(s) under a subscription and/or fee agreement and/or the service provider can receive payment from the sale of advertising content to one or more third parties.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

What is claimed is:

1. A method for protecting a protected avatar from actions of a second avatar within a virtual universe, comprising:

implementing by a processing unit protection for a protected avatar from a second avatar within a virtual universe; and providing an agreement defining a duty of a user associated with the second avatar to a user associated with the protected avatar;

the implementing protection comprising:

identifying by the processing unit an activity of the second avatar as a function of a behavior term of the agreement;

disqualifying by the processing unit the second avatar from engaging in the identified activity within the virtual universe as a function of a relation of the identified activity to the protected avatar and of interpreting the duty; and defining by the processing unit a protective action associated with the identified activity and executable against the protected avatar or the second avatar;

monitoring by the processing unit activity of the protected avatar or the second avatar within the virtual universe for an occurrence of the identified activity; and executing by the processing unit the protective action against at least one of the protected avatar and the second avatar in response to the monitoring detecting the occurrence of the identified activity.

2. The method of claim 1 wherein the identified activity is otherwise permissible by a virtual universe provider normative rule.

3. The method of claim 2, wherein the detecting the occurrence of the identified activity is a function of a rating of a region occupied by at least one of: the protected avatar and the second avatar.

4. The method of claim 3, wherein the detecting the occurrence of the identified activity is further a function of second avatar historical behavior data.

5. The method of claim 1, wherein:

the agreement is a restraining order issued by a court of law having jurisdiction over the protected avatar user and the second avatar user;

the implementing the restraining order comprising deriving a threshold graphical user interface avatar proximate distance as a function of a separation distance specified by the restraining order; and the identified activity comprising the protected avatar and the second avatar locating within a graphical user interface display proximate to each other by less than the threshold avatar proximate distance.

6. The method of claim 1, wherein the protected avatar is a protected group of avatars, each of the protected group of avatars having a common indicia determining an application of the defined duty to the each avatar of the protected group.

7. The method of claim 1, the implementing the protection further comprising identifying a banned virtual universe item; and the identified activity further comprising:

the second avatar adding the banned virtual universe item to an inventory of the second avatar; or the second avatar presenting the banned virtual universe item to the protected avatar.

8. A method for protecting a protected avatar from actions of a second avatar within a virtual universe, comprising:

implementing by a processing unit protection for a protected avatar from a second avatar within a virtual universe;

the implementing protection comprising:

identifying by the processing unit an activity of the second avatar;

disqualifying by the processing unit the second avatar from engaging in the identified activity within the virtual universe as a function of a relation of the identified activity to the protected avatar;

defining by the processing unit a protective action associated with the identified activity and executable against the protected avatar or the second avatar;

monitoring by the processing unit activity of the protected avatar or the second avatar within the virtual universe for an occurrence of the identified activity; and executing by the processing unit the protective action against at least one of the protected avatar and the second avatar in response to the monitoring detecting the occurrence of the identified activity;

wherein executing the protective action comprises at least one of:

transporting the protected avatar or the second avatar to another region within the virtual universe;

providing a warning to the protected avatar of a location of the second avatar relative to the first avatar within the virtual universe; and preventing a proximity of the protected avatar to the second avatar within a graphical user interface display less than a protective distance threshold.

9. The method of claim 8, wherein taking the protective action further comprises:

offering the second avatar enrollment in a virtual universe provider enhanced monitoring program; and suspending participation in the virtual universe by the second avatar if the second avatar fails to enroll in the offered enhanced monitoring program.

10. The method of claim 9, wherein executing the protective action further comprises at least one of:

teleporting the second avatar to a restricted-rights region; and determining and charging a variable fee amount for enrollment in the offered enhanced monitoring program as a function of second avatar historical behavior data.

11. A method for providing protective services to a virtual universe resident, comprising:

a service provider offering protective services for a virtual universe client resident;

in response to an acceptance of the offered services, the service provider implementing protection for the virtual universe client resident from a second resident within a virtual universe; and the service provider protection implementing comprising preventing the second resident from engaging in a proscribed activity as a function of an association of the proscribed activity with the client resident, by:

the service provider receiving an agreement defining a duty of the second resident with respect to the client resident;

the service provider identifying the proscribed activity by parsing the agreement and interpreting the duty;

the service provider monitoring activity of at least one of the client resident and the second resident within the virtual universe for indicia of the identified proscribed activity; and the service provider executing a protective action against at least one of the client resident and the second resident in response to the monitoring detecting the indicia.

12. The method of claim 11, wherein the client resident is a group of client residents, and wherein the service provider executing the protective action comprises protecting the group by teleporting the group to a region of the virtual universe unoccupied by the second resident.

13. The method of claim 11, wherein the service provider executing the protective action comprises selecting at least one of:
- requiring the second resident to enroll in an enhanced monitoring program; and
- restraining activities of the second resident within the virtual universe;
- wherein the selecting is a function of a rating of a region occupied by the client resident and second resident historical behavior data.

14. An article of manufacture, comprising:
a computer readable tangible storage device having computer-readable program code embodied therewith, the computer-readable program code comprising instructions that, when executed by a computer processing unit, cause a computer system processing unit to:
- specify a threshold graphical user interface avatar proximate distance;
- distinguish an activity of the second avatar within the virtual universe as a function of a relation of the distinguished activity to the protected avatar;
- define a protective action associated with the distinguished activity and executable against the protected avatar or the second avatar;
- monitor activity of at least one of the protected avatar and the second avatar within the virtual universe for the distinguished activity; and
- execute the protective action against at least one of the protected avatar and the second avatar in response to the monitoring detecting the distinguished activity by preventing the protected avatar and the second avatar from co-locating within a graphical user interface display proximate to each other by less than the threshold avatar proximate distance.

15. The article of manufacture of claim 14, the program code comprising instructions which, when executed on the computer system processing unit, causes the computer system processing unit to execute the protective action as a function of a rating of a region occupied by the protected avatar and second avatar historical behavior data.

16. The article of manufacture of claim 14, the program code comprising instructions which, when executed on the computer system processing unit, causes the computer system processing unit to execute the protective action by:
- transporting the protected avatar or the second avatar to another region within the virtual universe; or
- providing a warning to the protected avatar of a location of the second avatar relative to the first avatar within the virtual universe.

17. A programmable device comprising:
a processing unit;
a memory in communication with the processing unit;
a tangible computer-readable storage device in communication with the processing unit; and
a network interface in communication with the processing unit;
wherein the processing unit, when executing program instructions stored on the computer-readable storage device via the computer readable memory:
- detects an avatar activity hostile to a protected avatar within a virtual universe;
- prevents a second avatar from engaging in the hostile activity within the virtual universe as a function of a relation of the hostile activity to the protected avatar;
- monitors activity of the protected avatar or the second avatar within the virtual universe for the hostile activity; and
- causes a virtual universe computer application to take a protective action against at least one of the protected avatar and the second avatar in response to the monitoring detecting the hostile activity by preventing the protected avatar and the second avatar from locating within a graphical user interface display proximate to each other by less than a threshold avatar proximate distance.

18. The programmable device of claim 17, wherein the processing unit further causes the virtual universe computer application to take the protective action by:
- transporting the protected avatar or the second avatar to another region within the virtual universe; or
- providing a warning to the protected avatar of a location of the second avatar relative to the protected avatar within the virtual universe.

* * * * *